United States Patent Office 3,301,843
Patented Jan. 31, 1967

3,301,843
2,6-DIHALO-PYRIMIDINE-4-CARBOXAMIDO DYESTUFFS
Paul Dussy, Munchenstein, Basel-Land, and Marcel Reding and Werner Bossard, Riehen, Switzerland, assignors to J. R. Geigy A.G., Basel, Switzerland
No Drawing. Continuation of application Ser. No. 6,882, Feb. 5, 1960. This application Dec. 2, 1963, Ser. No. 327,528
Claims priority, application Switzerland, Feb. 6, 1959, 69,202/59
14 Claims. (Cl. 260—146)

This application is a continuation of our pending patent application Serial No. 6,882 filed February 5, 1960, which has been forfeited and now abandoned.

The present invention relates to reactive dyes, which can be fixed on textile fibers, containing recurring condensable groups such as hydroxy and amino groups, e.g. on natural or regenerated cellulose and on keratinous fibers, such as wool. Another feature of the instant invention is to provide processes for the manufacture of the new dyes. The invention also relates to dyed material of exceptional wet fastness, primarily to dyed cellulose material, produced with the new dyes.

The new dyes of our invention correspond to the general formula

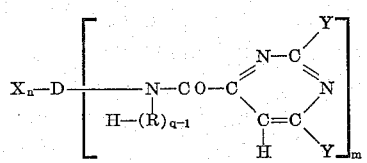

(I)

In this formula:

X means the same or different acid dissociating, water-soluble alkali metal and ammonium salt-forming groups, e.g. carboxylic acid, phosphonic acid, acylated sulfonic acid amide, disulfimide and preferably sulfonic acid groups,
$n$ means a lower whole number of at least two, preferably 2 to 3,
D means the radical of an organic dyestuff, primarily selected from the groups consisting of monoazo, disazo, anthraquinone and phthalocyanine dyestuffs,
R represents a divalent lower aliphatic radical such as methylene, ethylene, propylene,
Y represents halogen of the atomic number 17 to 35, and preferably is chlorine, and
$m$ and $q$ each are one of the integers one and two, advantageously both are one.

As acid dissociating, water solubilising group X, mainly the sulphonic acid group is used, but in addition also the carboxyl group or, for example, acylated sulphonic acid amide groups such as alkyl or aryl disulphamide groups or alkyl or aryl carbonyl sulphimide groups, phosphonic acid groups or sulphate groups can be used. There are, advantageously, 2 to 3 of these acid water solubilising groups but there may also possibly be 4.

They can be the same as or different from each other. It is of advantage if, in addition to other acid groups, there is always at least one sulphonic acid group.

The acid, water solubilising groups X which are substituents of D, can be in the form of the free acid as well as, advantageously in the form of their alkali metal salts, e.g. the lithium, sodium, potassium or ammonium salts.

A particularly valuable class of dyestuffs according to the invention have the formula

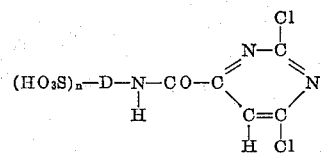

wherein D represents the radical of an organic dye selected from the group consisting of monoazo dyes, disazo dyes, anthraquinone dyes and phthalocyanine dyes, and
$n$ represents 2 to 3.

In the following, the radical:

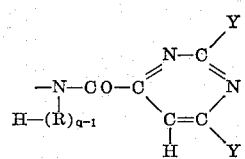

will be referred to by the symbol "Z."

D, more precisely, is the organic radical of a dye selected from the groups consisting of benzene-azo-benzene dyes, of benzene-azo-naphthalene dyes, of benzene-azo-pyrazole dyes, of naphthalene-azo-naphthalene dyes, of benzene-azo-benzene-azo-benzene dyes, of benzene-azo-benzene-azo-naphthalene dyes, of benzene-azo-naphthalene-azo-benzene dyes, of naphthalene-azo-benzene-azo-benzene dyes, of naphthalene-azo-benzene-azo-naphthalene dyes, which mono- and dis-azo dyes contain each of the substituents X and Z at any of the aromatic nuclei, bound thereto direct or by means of divalent bridging members such as, e.g. phenylcarbamyl or benzothiazolyl groups and which may also contain heavy metals such as copper, chromium or cobalt in complex union, of α-amino-anthraquinonylphenyl-amino dyes which contain X at any of the isocyclic rings and the Z substituent preferably at the phenylamino group, bound direct thereto or by means of divalent bridging members such as phenylene, phenylenoxy and phenylene-methylene radicals, and of copper phthalocyanine sulphonic acid arylamide dyes containing X at any aromatic nucleus and the Z substituent at the arylamide group bound to the aryl radical thereof direct or by means of a divalent bridging member such as phenylene and styrylene.

In the case of azo dyes, D, in the general Formula I, preferably is the radical of a monoazo dye and amongst the disazo dyes preferably is the radical of a naphthalene-azo-benzene-azo-benzene dye containing two sulphonic acid groups at the naphthalene ring and a Z substitutent at the external phenyl radical in p-position to the azo group. Out of the monoazo dyes, D preferably is the radical of a dye selected from the group consisting of the following classes of dyes:

(a) naphthyl-azo-phenyl dyes containing more than one X at the naphthyl radical and one substitutent Z at the phenyl radical in p-position to the azo group;

(b) 4-(phenyl-azo)-5-pyrazolone dyes containing at the phenyl radical a sulphonic acid group in o-position to the azo group and a Z substituent in meta-position to the azo group;

(c) 1-(phenyl-azo)-2-aminonaphthyl dyes containing at the phenyl radical a sulphonic acid group in o-position to the azo group and a Z substituent in one of the positions meta and para to the azo group;

(d) 2-(phenyl-azo)-1-hydroxynaphthyl dyes containing a sulphonic acid group at the phenyl radical in o-position to the azo group and a Z substituent in one of the positions meta and para to the azo group of the phenyl radical and 5,6,7, and 8 of the naphthyl radical (if in position 6, also preferably a sulphonic acid group in 3-position and if, as preferred, in position 8, also a sulphonic acid group in 3-position, and optionally an additional sulphonic acid group in one of the 5 and 6 positions);

(e) o.o'-dihydroxy-phenyl-azo-naphthyl dyes containing a Z substituent at the azo-free ring of the naphthyl radical and containing also one of the metals copper, chromium and cobalt in complex union;

(f) o.o'-dihydroxy-naphthyl-azo-naphthyl dyes containing a Z substituent at the azo-free ring of one of the naphthyl radicals and containing also one of the metals copper, chromium and cobalt in complex union.

In the case of anthraquinone dyes, D preferably is the radical of a (g) 4-amino-3-sulphonic acid-1-anthraquinonyl-phenylamino dye containing a Z substituent at the phenylimino group, preferably in the meta position to the phenyl radical.

In the case of phthalocyanine dyes, D preferably is the radical of (h) copper phthalocyanine dyes containing a sulphonic acid phenylamido substituent which itself contains a Z substituent at the phenyl radical in one of the meta and para positions to the imino group.

The dyes of the instant invention are obtained if organic dyestuffs which contain the acid, salt-forming, water solubilising groups and at least one acylatable primary or secondary amino group, are reacted with a 2.6-dihalogen-pyrimidine-4-carboxylic acid halide until the acylatable primary and secondary amino groups are completely acylated.

A modification of this process for the production of reactive dyestuffs according to the invention consists in using to form such dyestuffs components which together contain at least one primary or secondary amino group acylated by a 2.6-dihalogen-pyrimidine-4-carboxylic acid, the components being so chosen that the dyestuffs contain acid, salt-forming, water solubilising groups.

As mentioned above, if D is an azo dyestuff then it is primarily the radical of a monoazo dyestuff, and secondly the radical of a disazo dyestuff. The amino group acylated according to the invention can be in the diazo or in a coupling component; in disazo dyestuffs it can also possibly be in a middle component and possibly also in two components. Azo dyestuffs according to the invention can be formed either by using diazo and/or azo components which, as defined, contain at least one acylated amino group, or suitable aminoazo dyestuffs can be acylated using acylating agents which introduce a halogen pyrimidine carboxylic acid radical.

Suitable aminoazo dyestuffs contain advantageously 2 to 3 acid dissociating, water solubilising groups, in particular sulphonic acid groups, and, advantageously, one, or also two, sterically unhindered advantageously primary amino groups and, possibly, low aliphatically substituted amino groups. For example, negative substituents in the o-position to the amino group such as arylazo or sulphonic acid groups make the acylation more difficult. Thus amino groups in the o-position to an arylazo group or a sulphonic acid group are not to be regarded as acylatable amino groups in the aminoazo dyestuffs to be acylated according to the invention.

Amino azo dyestuffs used according to the invention are obtained, for example, from nitro azo dyestuffs by reduction of the nitro group to the amino group. In these dyestuffs the nitro group can be bound direct to an aryl radical bound to the azo group or it can be in an external aryl radical, for example in the aryl radical of an aroylamino substituent such as, e.g. in an m- or p-nitrobenzoylamino group.

Other amino azo dyestuffs used according to the invention are obtained by coupling diazo compounds, particularly diazotised aminobenzene or aminonaphthalene sulphonic acids with azo components which contain acylatable amino groups in the dyestuff molecule. Examples of such azo components are both the aromatic amines coupling in the p-position to an acylatable amino group and the alkaline-coupling aminohydroxynaphthalene compounds, in particular their sulphonic acids such as 2-amino-5-hydroxynaphthalene-7-sulphonic acid, 2-amino-8 - hydroxynaphthalene-6-sulphonic acid, 1-amino-5-hydroxynaphthalene-7-sulphonic acid, 1-amino-8-hydroxynaphthalene-4-sulphonic acid, 1-amino-8-hydroxynaphthalene-3.6-or -4.6-disulphonic acid as well as the m- or p-aminobenzoyl derivatives thereof, 2-m- or 2-p-aminophenyl-(1'-hydroxynaphtho-5'.6')-thiazole- or -imidazole- or 1.2.3-triazole-3'-sulphonic acid, 2-m- or 2-p-aminobenzoylamino-6-hydroxynaphthalene - 8 - sulphonic acid, also 1-(4'- or 3'-aminophenyl)-3-methyl-5-pyrazolone, 1-[4''-aminostilbyl-(4')] - 3 - methyl-5-pyrazolone-2'.2''-disulphonic acid to name only some of the most important components.

On producing dyestuffs according to the invention by using components which already contain an acylated amino group as defined, as has already been mentioned, this group can be both in the diazo or in the coupling component and, possibly, also in middle components.

Examples of diazo components having an acylamino group according to the invention are: 4 - acylamino - 2-aminobenzene - 1 - sulphonic acids, 5 - acylamino - 2-aminobenzene - 1 - sulphonic acids, 4 - acylamino - 1-aminonaphthalene - 6- or - 7 - sulphonic acids, 4- or 5-(4'- or 3' - acylaminobenzoylamino) - 2 - aminobenzene-1-sulphonic acids.

Examples of azo components having an acylamino group as defined which can be used for the modified process are obtained from the alkaline coupling, aminocontaining coupling components listed in the preceding paragraph if, before being coupled, they are treated with acylating agents under conditions which allow the introduction of the halogen pyrimidine carboxylic acid radical into the amino group.

If this group is the acyl radical of 1-amino-3-acylaminobenzenes which can couple in the 4-position, then these are middle components having a reactive group which can be used according to the invention.

As has already been stressed, the azo dyestuffs corresponding to D can also contain heavy metal, particularly copper, cobalt or chromium, bound in complex linkage. The dyestuffs in this case are, advantageously, complex metal compounds of o.o' - dihydroxy azo dyestuffs, of o - carboxy - o' - hydroxy azo dyestuffs and, more seldom, o - hydroxy - o' - amino azo dyestuffs which contain amino groups which can be acylated. Generally, the metal complex compounds of the amino azo dyestuffs are produced advantageously by any known method before the acyl radical as defined is introduced.

If D is the radical of a phthalocyanine dyestuff, this can either be free from metal or can contain cobalt, nickel, titanium, tin and, particularly, copper. Advantageously these dyestuffs are compounds which contain the acylamino group as defined not bound direct to an organic substituent linked by means of a sulphamide group to this structure, which substituent can be of the aliphatic or aromatic series.

Even if D is the radical of an anthraquinone dyestuff, the acylamino group as defined is advantageously not bound direct to the anthraquinone structure but is a substituent of, for example, nuclear bound phenylamino, diphenylamino, phenoxy, phenoxyphenyl-amino, phenylthio or phenylthiophenylamino groups. On the other hand, the acid, water solubilising groups, particularly the sulphonic acid groups, can be present as substituents of the anthraquinone radical and as substituents of external aryl radicals of nuclear bound groups, for example as substituents in one of the groups listed above. Anthraquinone dyestuffs according to the invention are derived advantageously from 1.4 - diamino - anthraquinone having at least one amino group which, in particular, is aromatically substituted, and from corresponding nuclear substituted derivatives, for example from 2-, 5-, 6- and 7-halogen-, 5- or 8-hydroxy-, 5- or 6-alkylsulphonyl-, 5- or 6-trifluoromethyl-1.4-diamino-anthraquinone compounds and, in particular, also from the corresponding 1.4 - diamino - anthraquinone - 2 - mono- or -2.5-, -2.6-, -2.7- or -2.8-disulphonic acids.

The dyestuffs or dyestuff components containing acylatable primary or secondary amino groups are acylated advantageously by using aqueous solutions of alkali metal salts of the sulphonic acids with the carboxylic acid chlorides or bromides. The acylation is performed at moderate temperatures of about 0° C. to at most 45° C. either in the presence of or while gradually adding mineral acid buffering agents such as sodium acetate, sodium formiate, sodium carbonate or sodium bicarbonate, advantageously in a slightly acid pH range and, possibly, in the presence of mixtures of buffer salts. The acylation products are also isolated advantageously from an acid medium, generally by salting out. The products are dried advantageously at a moderate heat under reduced pressure. These precautions prevent the undesirable premature replacement of the mobile substituent of the hetero ring, for example, by the hydroxyl group under hydrolysis. Further details can be seen from the following examples.

The dyestuffs according to the invention have good water solubility and are very well suited for the attainment of wet-fast dyeings, particularly on cellulose fibres, by impregnation thereof with the dyestuff solutions and fixation with agents raising the pH value. The dyestuffs according to the invention are distinguished in that this fixation can be performed at relatively low temperatures.

The following examples illustrate the invention. Where not otherwise stated, parts are given therein as parts by weight; the temperatures are in degrees centigrade. The relationship of parts by volume to parts by weight is as that of cubic centimeters to grams.

EXAMPLE 1

42.1 parts of the amino monoazo dyestuff

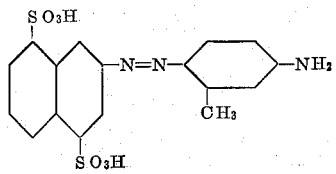

are dissolved in 500 parts of water and the solution is made neutral with sodium carbonate and then cooled to 10–15°. 22 parts of 2,6-dichloropyrimidine-4-carboxylic acid chloride are added dropwise to this solution within 30 minutes while stirring, care being taken that the solution always has a weakly acid reaction to litmus paper, i.e. that it has a pH value of 6 to 6.5, by the simultaneous dropwise addition of sodium carbonate solution. As soon as no free amino groups can be traced in a small sample by diazotizing and coupling, the dyestuff of the formula

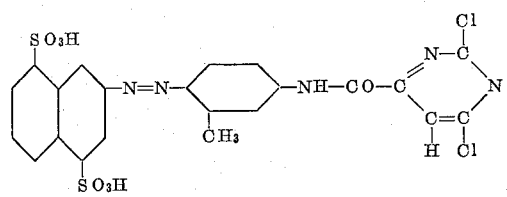

is precipitated with sodium chloride, filtered off and washed with diluted sodium chloride solution. After drying in vacuo, the dyestuff is an orange-yellow powder which dissolves in water with a yellow color and in concentrated sulfuric acid with a red color.

If instead of 22 parts of 2,6-dichloropyrimidine-4-carboxylic acid chloride in the above example, 35.5 parts of 2,6-dibromopyrimidine-4-carboxylic acid bromide are used, a dyestuff is obtained which has similar properties.

Fast cellulose dyeings are attained as follows:

2 parts of the dyestuff are dissolved in 4000 parts of water. 100 parts of cotton are entered at 20–25° C. and the bath is warmed within 30 minutes to 40–45°. At the same time, sodium chloride is added so that the content is finally 50 g. per litre. 10 parts of trisodium phosphate are then added and dyeing is performed at this temperature for 60 minutes. The goods are then rinsed and soaped at the boil for 30 minutes—the soaping solution is only slightly coloured. A level, clear yellow dyeing is obtained which is fast to light, washing and boiling.

The 2.6-dichloropyrimidine-4-carboxylic acid chloride necessary for the production of the dyestuff is produced as follows: 15.6 parts of 2.6-dihydroxypyrimidine-4-carboxylic acid are mixed with 42 parts of phosphorus oxychloride and the mixture is refluxed in the presence of a slight amount of pyridine until no more hydrochloric acid gas is developed. The reaction mixture is dropped onto ice and water, the mixture is filtered and the 2.6-dichloropyrimidine-4-carboxylic acid is extracted from the residue with chloroform. It is obtained from chloroform in the form of white platelets which melt at 98°.

*Analysis.*—Calculated: C, 31.08%; H, 1.03%; N, 14.5%; Cl, 36.78%. Found: C, 30.80%, 31.19%; H, 1.03%; N, 14.56%; Cl, 36.68%.

2.6-dichloropyrimidine-4-carboxylic acid chloride is obtained from this carboxylic acid by boiling with thionyl chloride. The acid chloride is a colourless liquid; B.P.$_{10}$=116°.

If in the process described in the first paragraph of this example, instead of the dyestuff mentioned above, equimolecular parts of the amino aza dyestuffs listed in the following Table I are used, then, under corresponding conditions with a small excess of 2.6-dichloropyrimidine-4-carboxylic acid chloride, similar dyestuffs are obtained, which produce fast cellulose dyeings which also have good wet fastness properties, by the dyeing method described in the third paragraph.

The dyestuffs listed in the table are obtained by diazotising the diazo component and coupling with the azo component in an acid medium at pH values of the coupling mixtures of 2.0 to 4.5.

is precipitated with sodium chloride, filtered off and dried in vacuo at 20–25°. It is a dark powder which dissolves

*Table 1*

| No. | Diazo component | Coupling component | Shade of dyeing |
|---|---|---|---|
| 1 | 2-aminonaphthalene-4.8-disulphonic acid | 1-amino-2-methoxy-5-methylbenzene | Yellow. |
| 2 | 1-aminonaphthalene-3.6-disulphonic acid | 1-amino-3-methylbenzene | Do. |
| 3 | 2-aminonaphthalene-4.8-disulphonic acid | 1-N-ethylamino-3-methylbenzene | Do. |
| 4 | ....do.... | 1-amino-3-acetylaminobenzene | Do. |
| 5 | 2-aminonaphthalene-5.7-disulphonic acid | 1-amino-3-methoxybenzene | Do. |
| 6 | 2-aminonaphthalene-6.8-disulphonic acid | 1-amino-2-methoxy-5-methylbenzene | Do. |
| 7 | 2-aminonaphthalene-4.8-disulphonic acid →1-amino-2-methoxy-5-methylbenzene. | 1-amino-3-methylbenzene | Yellow-brown. |
| 8 | 4-aminoazobenzene-3.4'-disulphonic acid | 1-amino-3-methylbenzene | Do. |
| 9 | 1-aminobenzene-4-sulphonic acid →1-aminonaphthalene-6-sulphonic acid. | 1-aminobenzene | Do. |
| 10 | 4-aminoazobenzene-3.4'-disulphonic acid | 1-amino-3-acetylaminobenzene | Orange-brown. |
| 11 | 2-aminonaphthalene-4.8-disulphonic acid | 1-aminobenzene | Yellow. |
| 12 | 2-aminonaphthalene-6.8-disulphonic acid | 1-amino-3-methoxybenzene | Do. |
| 13 | 6-methyl-2-[3'-sulpho-4'-aminophenyl]-benzthiazole-7-sulphonic acid. | 1-aminobenzene | Do. |
| 14 | Mixture of: 3-aminopyrene-5.8-disulphonic acid and 3-aminopyrene-5.10-disulphonic acid. | 1-amino-3-methylbenzene | Yellow-orange. |
| 15 | 2-aminonaphthalene-4.8-disulphonic acid | 1-N-methylaminomethylbenzene | Yellow. |

EXAMPLE 2

18.8 parts of 1.3-diaminobenzene-4-sulphonic acid are dissolved in 200 parts of water and the solution is neutralised with sodium carbonate. 22 parts of 2.6-dichloropyrimidine-4-carboxylic acid chloride are added dropwise to the solution at 0–5° while stirring, the addition being made within 1 hour, and the pH of the reaction mixture is kept at 6 to 6.5 by the addition of sodium carbonate solution. On completion of the condensation, the intermediate product is precipitated with sodium chloride, filtered off and dissolved in 400 parts of water. The intermediate product is diazotised by adding to the solution at 0–5° first 25 parts of 30% hydrochloric acid and then 6.9 parts of sodium nitrite. The diazonium compound is coupled with a solution of 31.9 parts of 2-amino-8-hydroxynaphthalene-3.6-disulphonic acid in 200 parts of water, the coupling mixture having a pH of 4–4.5. On completion of the coupling, the new dyestuff of the formula

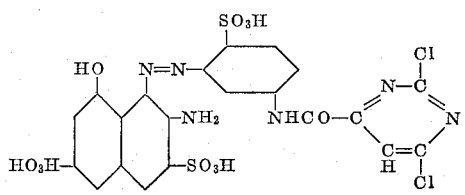

in water and in concentrated sulphuric acid with a red colour.

If, instead of 22 parts of 2.6-dichloropyrimidine-4-carboxylic acid chloride in the above example, 35.5 parts of 2.6-dibromopyrimidine-4-carboxylic acid bromide are used, a dyestuff is obtained which has similar properties. Fast cellulose dyeings are obtained as follows:

Cotton is foularded with a 1% solution of the new dyestuff at 20° with the addition of 5 g. of sodium carbonate per litre. It is then rolled up and exposed to a heat of 95° for 2 hours. After rinsing, the goods are soaped at the boil for 30 minutes—only a little dyestuff bleeds out. A red dyeing which is fast to light and boiling is obtained.

Dyestuffs having similar properties are obtained if the diaminobenzene sulphonic acids listed in the following Table 2 are acylated with 2.6-dichloropyrimidine-4-carboxylic acid chloride under the conditions described above, the condensation product is diazotised and coupled with an equivalent amount of the coupling components given in column 3 at the pH values given in column 4.

EXAMPLE 3

58 parts of the amino monoazo dyestuff of the formula

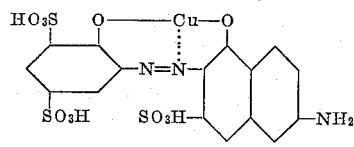

*Table 2*

| No. | Diamino compounds | Coupling components | pH of the coupling | Shade on cotton |
|---|---|---|---|---|
| 1 | 1.3-diaminobenzene-4-sulphonic acid | 1-benzoylamino-8-hydroxynaphthalene-3.6-disulphonic acid. | 7–8 | Red. |
| 2 | ....do.... | 1-acetylamino-8-hydroxynaphthalene-3.6-disulphonic acid. | 7–8 | Red. |
| 3 | ....do.... | 1-(2'-chloro-5'-sulphophenyl)-3-methyl-5-pyrazolone | 6–7 | Yellow. |
| 4 | ....do.... | 1-naphthyl-(2')-3-methyl-5-pyrazolone-5'.7'-disulphonic acid. | 6–7 | Do. |
| 5 | ....do.... | 1-(2'.5'-disulphophenyl)-3-methyl-5-pyrazolone | 4–5 | Do. |
| 6 | ....do.... | 1-(3'-sulphophenyl)-3-methyl-5-iminopyrazole | 4–5 | Do. |
| 7 | ....do.... | 1-naphthyl-(2')-3-methyl-5-pyrazolone-4'.8'-disulphonic acid. | 4–5 | Do. |
| 8 | ....do.... | 2-aminonaphthalene-5.7-disulphonic acid | 4–5 | Orange. |
| 9 | ....do.... | 2-aminonaphthalene-3.6-disulphonic acid | 4–5 | Do. |
| 10 | ....do.... | 2-N-methylamino-8-hydroxynaphthalene-6-sulphonic acid. | 4–5 | Blue-red. |
| 11 | ....do.... | 1-[4'-(2'.6'-dichloropyrimidoylamino)]-8-hydroxynaphthalene-3.6-disulphonic acid. | 7–8 | Red. |
| 12 | ....do.... | 2-hydroxynaphthalene-3.6-disulphonic acid | 8–8.5 | Scarlet. |
| 13 | ....do.... | 2-hydroxynaphthalene-6.8-disulphonic acid | 8–8.5 | Orange. |
| 14 | ....do.... | 1-[4'-(2'.6'-dichloropyrimidoylamino)]-8-hydroxynaphthalene-4.6-disulphonic acid. | 7–8 | Red. |
| 15 | 1.4-diaminobenzene-3-sulphonic acid | 2-amino-8-hydroxynaphthalene-6-sulphonic acid | 4–4.5 | Red. |
| 16 | ....do.... | 2-aminonaphthalene-5.7-disulphonic acid | 4–4.5 | Orange. |
| 17 | ....do.... | 2-aminonaphthalene-3.6-disulphonic acid | 4–4.5 | Do. |
| 18 | ....do.... | 2-acetylamino-5-hydroxynaphthalene-7-sulphonic acid | 6–7 | Scarlet. |
| 19 | ....do.... | 1-acetylamino-5-hydroxynaphthalene-7-sulphonic acid | 6–7 | Red. |

(obtained by coupling diazotised 2-amino-1-hydroxybenzene-4,6-disulphonic acid with 2-amino-5-hydroxynaphthalene-7-sulphonic acid in an alkaline medium and treating the amino monoazo dyestuff obtained with an agent giving off copper), are dissolved in 1200 parts of water and the solution in neutralised with sodium carbonate. 22 parts of 2.6-dichloropyrimidine-4-carboxylic acid chloride are added dropwise within 1 hour to the solution at 10–15° while stirring and at the same time an aqueous sodium carbonate solution is added dropwise in such a manner that the reaction mixture always has a weakly acid reaction. As soon as no more amino monoazo dyestuff can be traced, the new dyestuff of the formula

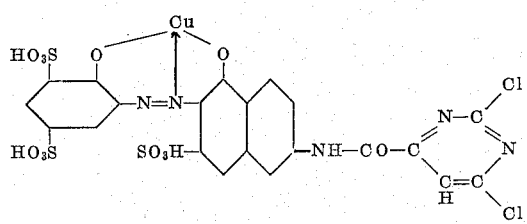

is precipitated by the addition of sodium chloride, filtered off and dried in vacuo at 20–25°. The dark powder dissolves in water and in concentrated sulphuric acid with a ruby red colour.

If in the above example, instead of 22 parts of 2.6-dichloropyrimidine-4-carboxylic acid chloride, 35.5 parts of 2.6-dibromopyrimidine-4-carboxylic acid bromide are used, then a dyestuff having similar properties is obtained.

Wet-fast dyeings are attained by foularding cotton with a 2% aqueous dyestuff solution containing 20% of urea and 1% of sodium bicarbonate at 20°, squeezing out, drying and then fixing for 2 minutes at 140–160°, rinsing and thereupon soaping at the boil for 30 minutes. The shade and strength of the dyeing are only slightly altered by the soaping. A strong, ruby red dyeing which is fast to light and boiling is obtained.

Dyestuffs having similar properties are obtained if, instead of the above amino monoazo dyestuff, corresponding parts of the complex metal compound of the amino azo dyestuffs given in the following Table 3 are used.

The aminoazo dyestuffs given in Table 3 are obtained by diazotising the o-amino-hydroxyaryl compounds given with sodium nitrite in a mineral acid solution and coupling the diazo compound with the corresponding amount of the coupling components given in a pyridine-soda alkaline or pyridine-ammonia alkaline medium. The amino-o.o'-dihydroxyazo dyestuffs obtained are metallised by treating with a usual agent giving off heavy metal.

Table 3

| No. | Amino azo dyestuff | Heavy metal bound in complex linkage | Shade on cotton |
|---|---|---|---|
| 1 | 1-amino-2-hydroxybenzene-5-sulphonic acid → 2-amino-5-hydroxy-naphthalene-7-sulphonic acid. | Cu | Ruby. |
| 2 | 6-nitro-1-diazo-2-hydroxynaphthalene-4-sulphonic acid → 2-amino-5-hydroxynaphthalene-7-sulphonic acid. | Cu | Violet. |
| 3 | ----do---- | Cr | Greenish grey. |
| 4 | 6-nitro-1-diazo-2-hydroxynaphthalene-4-sulphonic acid → 1-amino-8-hydroxynaphthalene-4-sulphonic acid. | Co | Reddish black. |
| 5 | 1-amino-2-hydroxybenzene-5-methylsulphone → 1-amino-8-hydroxynaphthalene-3.6-disulphonic acid. | Cu | Violet. |
| 6 | ----do---- | Co | Grey. |
| 7 | ----do---- | Cr | Greenish black. |
| 8 | 1-amino-2-methylbenzene-4-sulphonic acid → 1-amino-2-hydroxy-5-methylbenzene → 1-amino-8-hydroxynaphthalene-4.6-disulphonic acid. | Cu | Blue. |
| 9 | ----do---- | Co | Grey. |
| 10 | ----do---- | Cr | Greenish black. |
| 11 | [1-amino-2-chlorobenzene-4-sulphonic acid → 1-hydroxy-2-acetyl-aminobenzene] soaped → 1-amino-8-hydroxynaphthalene-3.6-disulphonic acid. | Cu | Navy blue. |
| 12 | ----do---- | Co | Grey. |
| 13 | 1-amino-8-hydroxynaphthalene-4-sulfonic acid ← 2,6-diamino-1-hydroxybenzene-4-sulfonic acid → 1,3-dihydroxybenzene. | Co | Black. |
| 14 | 1-amino-8-hydroxynaphthalene-3,6-disulfonic acid ← 2,6-diamino-1-hydroxybenzene-4-sulfonic acid → 2-hydroxynaphthalene. | Co | Do. |
| 15 | 1-amino-8-hydroxynaphthalene-4-sulfonic acid ← 2,6-diamino-1-hydroxybenzene-4-sulfonic acid → 3-methylpyrazolone-(5). | Co | Do. |

EXAMPLE 4

31.9 parts of 1-amino-8-hydroxynaphthalene-3,6-disulfonic acid are dissolved in 200 parts of water and the pH is adjusted to 5.5–6.0 with sodium carbonate. 22 parts of 2,6-dichloropyrimidine-4-carboxylic acid chloride are added dropwise with 1 hour at 0–5° while stirring and the pH value is kept at 5.5–6.0 by the slow dropwise addition of sodium carbonate solution. After no further diazotizable amino groups can be traced, the reaction product is precipitated with sodium chloride, filtered off and dissolved in 300 parts of water at 0–5°. 15 parts of sodium bicarbonate are added to this solution and a Congo neutral solution of 17.3 parts of diazotised 1-aminobenzene-2-sulphonic acid is poured in within 30 minutes. As soon as the coupling is complete, the precipitated new dyestuff of the formula

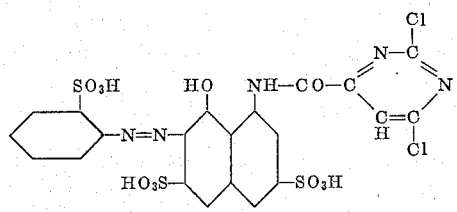

is filtered off, washed with diluted sodium chloride solution and dried in vacuo at 20–25°. It is a dark powder which dissolves in water with a red colour and in concentrated sulphuric acid with a blue-red colour.

If cotton is foularded with a 1% aqueous solution of this dyestuff at 20°, dried and then treated with a 1% sodium hydroxide solution containing 30% sodium chloride, steamed for 5 minutes at 100–103°, rinsed and then soaped at the boil for 30 minutes, a brilliant red dyeing which is fast to boiling is obtained.

If in the above example, instead of the condensation product from 1-amino-8-hydroxynaphthalene-3.6-disulphonic acid and 2.6-dichloropyrimidine-4-carboxylic acid chloride, a corresponding amount of the coupling components named in the following Table 4 is used and, instead of 1-aminobenzene-2-sulphonic acid, a corresponding amount of the diazo components given is used and otherwise the procedure described in the above example is followed, then dyestuffs having similar properties are obtained.

4.4'-diaminodiphenyl-2.2'-disulphonic acid or 14.8 parts of 4.4'-diaminostilbene-2.2'-disulphonic acid are used, and otherwise the same procedure is followed, similar dyestuffs are obtained.

If cotton is impregnated with an aqueous solution of the dyestuff as described in Example 3 in the presence of sodium bicarbonate and urea, squeezed out and heated for 2 minutes at 140–150°, then, after soaping, a pure blue dyeing is obtained. The dyed material has very good wet and light fastness properties.

Pure green dyeings are obtained, if, in this example, the copper phthalocyanine is replaced by 8 parts of 4.4'.4''.4'''-tetraphenyl copper phthalocyanine.

EXAMPLE 6

40.9 parts of 1-amino-4-(4''-aminophenylamino)-anthraquinone-2-sulphonic acid are added at 20–25° to 500 parts of 30% oleum. The reaction mixture is stirred for

*Table 4*

| No. | Diazonium compound from— | Coupling component | Shade on cotton |
|---|---|---|---|
| 1 | 1-aminobenzene-2-sulphonic acid | 1-[3'-(2''.6''-dichloropyrimidyl-(4'')-carbonylamino)-benzoylamino]-8-hydroxynaphthalene-3-6-disulphonic acid. | Red. |
| 2 | 1-amino-4-methylbenzene-2-sulphonic acid. | 1-(2'.6'-dichloropyrimidyl-(4')-carbonylamino)-8-hydroxynaphthalene-3.6-disulphonic acid. | Red. |
| 3 | 1-amino-3-acetylaminobenzene-4-sulphonic acid. | do | Red. |
| 4 | 1-amino-3-benzoylaminobenzene-4-sulphonic acid. | do | Red. |
| 5 | 1-amino-3-acetylaminobenzene-4-sulphonic acid. | 2-(2'.6'-dichloropyrimidyl-(4')-carbonylamino)-5-hydroxynaphthalene-7-sulphonic acid. | Orange. |
| 6 | 1-amino-4-acetylaminobenzene-3-sulphonic acid. | do | Scarlet. |
| 7 | 1-aminobenzene-2-sulphonic acid | 1-(2'.6'-dichloropyrimidyl-(4')-carbonylamino)-5-hydroxynaphthalene-7-sulphonic acid. | Orange. |
| 8 | 1-amino-2-carboxybenzene-4-sulphonic acid. | 2-(2'.6'-dichloropyrimidyl-(4')-carbonylamino)-5-hydroxynaphthalene-7-sulphonic acid. | Do. |
| 9 | 1-amino-2-carboxybenzene-5-sulphonic acid. | 1-(2'.6'-dichloropyrimidyl-(4')-carbonylamino)-8-hydroxynaphthalene-3.6-disulphonic acid. | Red. |
| 10 | 1-aminobenzene-2-sulphonic acid | 1-[4'-(2''.6''-dichloropyrimidyl-(4'')-carbonylamino)-3'-carboxyphenylamino]-5-hydroxynaphthalene-7-sulphonic acid. | Scarlet. |

EXAMPLE 5

10 parts of copper phthalocyanine in 70 parts of chlorosulphonic acid are heated for 4 hours at 140–142°. After cooling, the solution is poured onto a mixture of ice and sodium chloride and the suspension formed is filtered. The precipitate is washed with 10% sodium chloride solution until the filtrate no longer colours Congo Red paper blue. The filter cake is pasted in 100 parts of water and 100 parts of ice and the pH of the mixture is adjusted to 7 with diluted caustic soda lye. The solution of 7.5 parts of 1.3-diaminobenzene-4-sulphonic acid in 100 parts of water and 20 parts by volume of 2 N-caustic soda lye is added. The pH is kept constant at 8.4–8.5 with 50 parts by volume of 2 N-sodium carbonate solution. After stirring for 20 hours, the dyestuff is precipitated with sodium chloride and hydrochloric acid and is filtered off. The filter cake is dissolved in 400 parts of water and the pH brought to 5 to 5.3 with caustic soda lye. 11 parts of 2.6-dichloropyrimidine-4-carboxylic acid chloride are added dropwise to this solution within 30 minutes while stirring, the pH of the mixture being kept between 5 and 6.5 by the addition of diluted sodium carbonate solution. When no more amino groups can be traced, the dyestuff is salted out and dried in vacuo at 20–25°. The sodium salt of the copper phthalocyanine disulphonic acid-3' - (2''.6'' - dichloropyrimidoyl - (4''))-aminophenylamide-4'-sulphonic acid is a dark blue powder which dissolves in water.

If in the above example, instead of 11 parts of 2.6-dichloropyrimidine-4-carboxylic acid chloride, 18 parts of 2.6-dibromopyrimidine-4-carboxylic acid bromide are used, then a dyestuff having similar properties is obtained.

Also, if in the above example, instead of the 7.5 parts of 1.3-diaminobenzene-4-sulphonic acid, 13.8 parts of 24–36 hours at 20–25° and then poured onto ice. The precipitated dyestuff of the formula

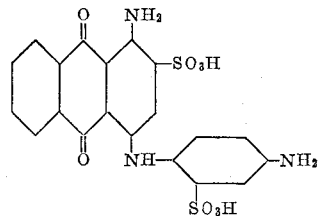

is filtered off and dried.

4.9 parts of this dyestuff are dissolved in 70 parts of water at 20° and the pH is adjusted to 6.0–6.5 with sodium carbonate. 2.2 parts of 2.6-dichloropyrimidine-4-carboxylic acid chloride and at the same time an aqueous sodium carbonate solution are then added dropwise within 20 minutes at 0–5° while stirring so that the pH of the solution is always 6.0–6.5. On completion of the acylation, the anthraquinone dyestuff of the formula

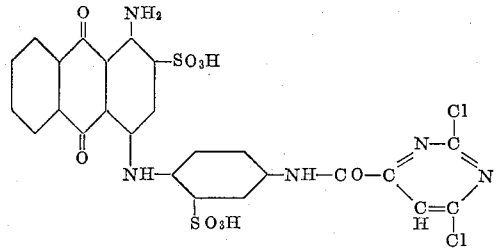

is precipitated with sodium chloride, filtered off, washed with sodium chloride solution and dried in vacuo at 20–25°. The dyestuff is a blue powder which dissolves in water with a blue colour and in concentrated sulphuric acid with a cloudy violet colour.

If, in the above example, instead of 2.2 parts of 2.6-dichloropyrimidine-4-carboxylic acid chloride, 3.6 parts of 2.6-bromopyrimidine-4-carboxylic acid bromide are used, a dyestuff having similar properties is obtained.

Fast cellulose dyeings are obtained with the new dyestuff by the following method:

2 parts of the dyestuff obtained according to the above example are dissolved in a dyebath of 4000 parts of water at 20°, and 2.5 parts of trisodium phosphate are added to the solution. 100 parts of cotton are entered and the bath is warmed within 30 minutes to 40-45° while adding sodium chloride in portions until the content is 50 g. per litre. The goods are treated for 60 minutes at this temperature, then rinsed and soaped for 30 minutes at the boil—the soap solution is only slightly coloured. A blue dyeing is obtained which is fast to light, washing and boiling:

Similar dyestuffs are obtained if, in the above example, corresponding amounts of the anthraquinone dyestuffs given in the following Table 6 are used.

Table 6

| No. | Anthraquinone dyestuff | Shade on cotton |
|---|---|---|
| 1 | [structure] | Blue. |
| 2 | [structure] (Mixture of 5- and 8-SO$_3$H) | Do. |
| 3 | [structure] | Blueish green. |
| 4 | [structure] (Mixture of 5- and 8-SO$_3$H) | Blue. |
| 5 | [structure] (Mixture of 5- and 8-SO$_3$H) | Do. |
| 6 | [structure] | Do. |
| 7 | [structure] | Do. |

Table 6—Continued

| No. | Anthraquinone dyestuff | Shade on cotton |
|---|---|---|
| 8 | 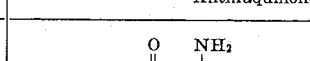 | Blue. |

We claim:

1. A dyestuff of the formula

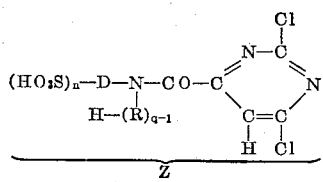

wherein

R is lower alkylene, q is an integer from 1 to 2 inclusive n is an integer from 2 to 3, inclusive and D is a dyestuff radical selected from the group consisting of (a) naphthyl-azo-phenyl with the Z moiety at the phenyl radical in p-position to the azo group;

(b) 4-(phenyl-azo)-5-pyrazolonyl containing at the phenyl radical a sulfonic acid group in o-position to the azo group and the Z moiety in meta-position to the azo group;

(c) 1-(phenyl-azo)-2-aminonaphthyl containing at the phenyl radical a sulfonic acid group in o-position to the azo group and the Z moiety in meta-position to the azo group;

(d) 1-(phenyl-azo)-2-aminonaphthyl containing at the phenyl radical a sulfonic acid group in o-position to the azo group and the Z moiety in para-position to the azo group;

(e) 2-(phenyl-azo) - 1 - hydroxynaphthyl containing a sulfonic acid group at the phenyl radical in o-position to the azo group and the Z moiety on the phenyl radical in meta-position to the azo group;

(f) 2-(phenyl-azo) - 1 - hydroxynaphthyl containing a sulfonic acid group at the phenyl radical in o-position to the azo group and the Z moiety on the phenyl radical in para-position to the azo group;

(g) 2-(phenyl-azo) - 1 - hydroxynaphthyl containing a sulfonic acid group at the phenyl radical in o-position to the azo group and the Z moiety on the naphthyl radical in position 5;

(h) 2-(phenyl-azo) - 1 - hydroxynaphthyl containing a sulfonic acid group at the phenyl radical in o-position to the azo group and the Z moiety on the naphthyl radical in position 6;

(i) 2-(phenyl-azo) - 1 - hydroxynaphthyl containing a sulfonic acid group at the phenyl radical in o-position to the azo group and the Z moiety on the naphthyl radical in position 7;

(j) 2-(phenyl-azo) - 1 - hydroxynaphthyl containing a sulfonic acid group at the phenyl radical in o-position to the azo group and the Z moiety on the naphthyl radical in position 8;

(k) o,o'-dihydroxy-phenyl-azo-naphthyl containing the the Z moiety at the azo-free ring of the naphthyl radical and the copper, chromium and cobalt complexes thereof; and (l) o,o' - dihydroxy-naphthyl-azo - naphthyl containing Z moiety at the azo-free ring of one of the naphthyl radicals and the copper, chromium and cobalt complexes thereof.

2. The dyestuff of the formula

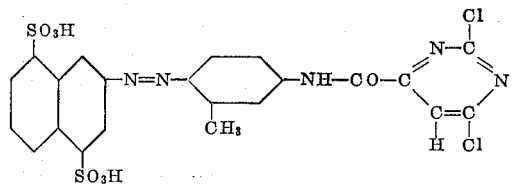

3. The dyestuff of the formula

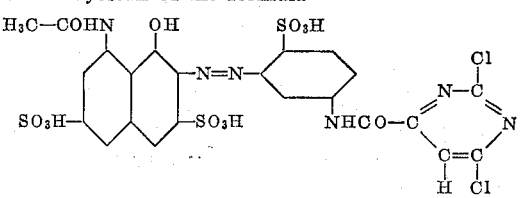

4. The dyestuff of the formula

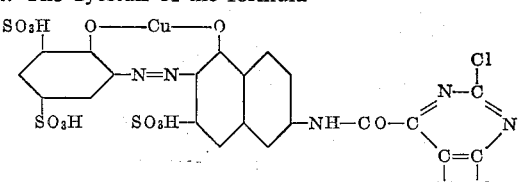

5. The dyestuff of the formula

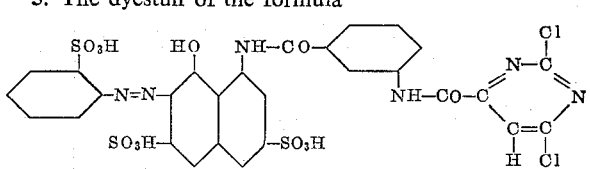

6. The dyestuff of the formula

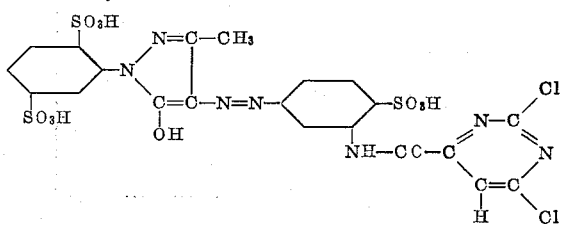

7. The dyestuff of the formula

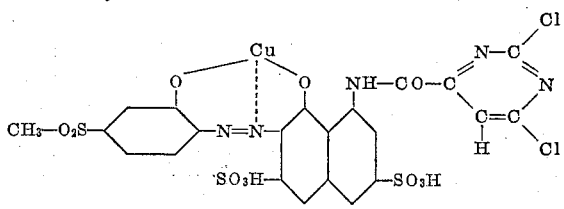

8. A reactive copper phthalocyanine dyestuff which contains from 1 to 3 sulfonic acid groups directly linked to the phthalocyanine nucleus and one reactive substituent selected from the group consisting of the radicals of the formulas

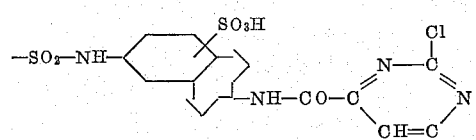

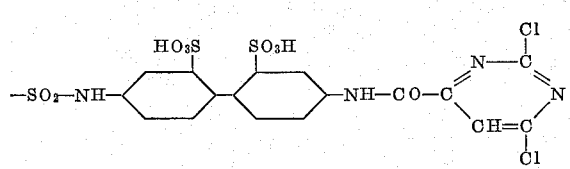

and

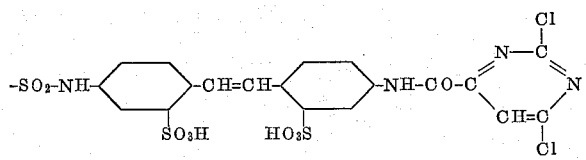

said reactive substituent being linked directly to the phthalocyanine nucleus.

9. A reactive copper phthalocyanine dyestuff which contains from 1 to 3 sulfonic acid groups directly linked to the phthalocyanine nucleus and one reactive substituent of the formula

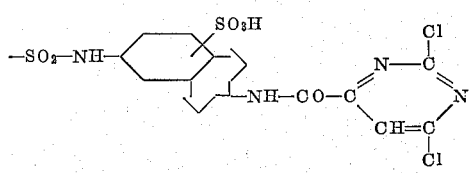

said reactive substituent being linked directly to the phthalocyanine nucleus.

10. A dyestuff of the formula

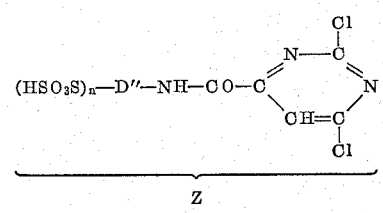

wherein
$n$ is an integer ranging from 2 to 3, inclusive, and
D″ is a 4-amino-3-sulfonic acid-1-anthraquinonylphenyl-amino radical containing the Z moiety at the benzene nucleus of the phenylamino group.

11. The dyestuff of the formula

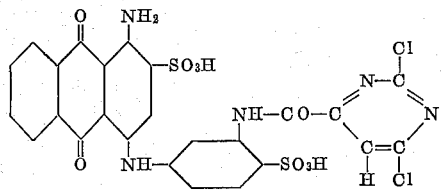

12. The dyestuff of the formula

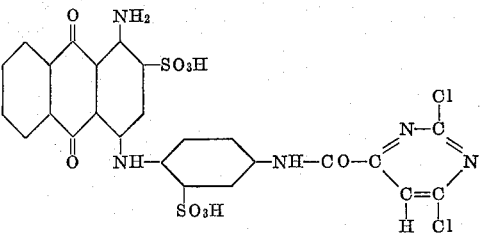

13. The dyestuff of the formula

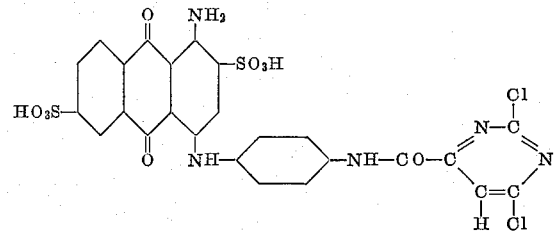

14. The dyestuff of the formula

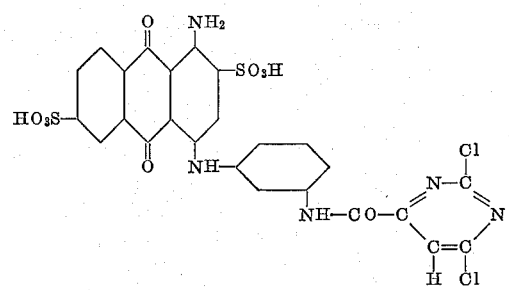

References Cited by the Examiner

UNITED STATES PATENTS

| | | | |
|---|---|---|---|
| 1,886,480 | 11/1932 | Haller et al. | 260—154 |
| 2,935,506 | 5/1960 | Haslop et al. | 260—154 |
| 3,029,123 | 4/1962 | Putter et al. | 260—147 XR |

FOREIGN PATENTS

| | | |
|---|---|---|
| 585,141 | 10/1959 | Canada. |
| 1,221,621 | 1/1960 | France. |
| 432,353 | 7/1935 | Great Britain. |
| 593,423 | 5/1959 | Italy. |

CHARLES B. PARKER, *Primary Examiner.*

FLOYD D. HIGEL, *Assistant Examiner.*